United States Patent
Paiement et al.

(10) Patent No.: US 10,057,420 B2
(45) Date of Patent: Aug. 21, 2018

(54) METHOD AND APPARATUS FOR IDENTIFYING A USER OF A MOBILE DEVICE

(71) Applicant: AT&T Intellectual Property I, L.P., Atlanta, GA (US)

(72) Inventors: Jean-Francois Paiement, Sausalito, CA (US); Sastry Isukapalli, Green Brook, NJ (US); Ann E. Skudlark, San Ramon, CA (US); Christopher T. Volinsky, Morristown, NJ (US); Dan Melamed, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 68 days.

(21) Appl. No.: 14/919,275

(22) Filed: Oct. 21, 2015

(65) Prior Publication Data
US 2017/0118632 A1    Apr. 27, 2017

(51) Int. Cl.
| | |
|---|---|
| *H04M 11/00* | (2006.01) |
| *H04M 3/42* | (2006.01) |
| *G06Q 30/00* | (2012.01) |
| *H04M 3/487* | (2006.01) |
| *H04M 7/12* | (2006.01) |

(52) U.S. Cl.
CPC ..... *H04M 3/4872* (2013.01); *H04M 3/42348* (2013.01); *H04M 7/128* (2013.01); *H04M 2203/2005* (2013.01); *H04M 2203/555* (2013.01)

(58) Field of Classification Search
CPC ............................... H04W 8/28; H04W 8/265
USPC .......................................................... 455/406
See application file for complete search history.

(56) References Cited

U.S. PATENT DOCUMENTS

| | | | |
|---|---|---|---|
| 6,735,431 B1 * | 5/2004 | Tsunami | H04W 84/02 455/414.2 |
| 6,898,274 B1 * | 5/2005 | Galt | H04Q 3/005 379/207.03 |
| 8,160,620 B2 | 4/2012 | Krause et al. | |
| 8,548,138 B2 | 10/2013 | Clark et al. | |
| 8,620,264 B2 | 12/2013 | Hicks | |
| 8,644,472 B1 | 2/2014 | Lemke | |
| 8,730,941 B1 | 5/2014 | Croak et al. | |
| 8,995,638 B2 | 3/2015 | Woicke | |
| 8,995,973 B2 | 3/2015 | Ramer et al. | |
| 9,008,291 B1 | 4/2015 | Lemke | |
| 2003/0144933 A1 * | 7/2003 | Huang | G06Q 30/02 705/35 |
| 2003/0149975 A1 * | 8/2003 | Eldering | H04N 7/17318 725/34 |

(Continued)

*Primary Examiner* — Rafael Pérez-Gutiérrez
*Assistant Examiner* — Mark G Pannell

(57) ABSTRACT

A method and apparatus for assigning a mobile device that is unassigned to a user are disclosed. Mobile phone numbers are used as a surrogate for device. For example, the method implemented via a processor obtains the phone number that is unassigned from a list of phone numbers associated with a billing account number, assigns the phone number that is unassigned to the user, wherein the user is selected from among a plurality of users associated with the billing account number, determines a confidence level for the assigning of the phone number that is unassigned to the user, and performs an analysis to provide a service for the user to whom the phone number is assigned.

20 Claims, 3 Drawing Sheets

(56) References Cited

U.S. PATENT DOCUMENTS

| | | | |
|---|---|---|---|
| 2003/0172374 A1* | 9/2003 | Vinson | G06Q 30/02 725/9 |
| 2006/0143027 A1* | 6/2006 | Jagannathan | G06Q 10/0637 705/7.36 |
| 2006/0223495 A1* | 10/2006 | Cassett | H04L 43/026 455/405 |
| 2008/0075245 A1* | 3/2008 | Pearson | H04M 3/42161 379/88.13 |
| 2009/0259518 A1* | 10/2009 | Harvey | G06Q 10/0639 705/7.29 |
| 2011/0191223 A1* | 8/2011 | Singh | G06Q 30/04 705/34 |
| 2012/0158461 A1* | 6/2012 | Aldrey | G06Q 30/0201 705/7.35 |
| 2014/0128039 A1* | 5/2014 | Maybach | H04M 3/53333 455/413 |
| 2014/0171021 A1* | 6/2014 | Davis | H04M 15/41 455/408 |
| 2014/0206326 A1* | 7/2014 | Hodges | H04W 4/16 455/415 |
| 2014/0273998 A1 | 9/2014 | Ramer et al. | |
| 2014/0278953 A1* | 9/2014 | Ismail | G06Q 30/0251 705/14.49 |

* cited by examiner

METHOD AND APPARATUS FOR IDENTIFYING A USER OF A MOBILE DEVICE

The present disclosure relates to a method and apparatus for identifying a user of a mobile device. A phone number is used from among a plurality of users associated with a Billing Account Number (BAN) as a surrogate for mobile device.

BACKGROUND

A network service provider may enable a plurality of user endpoint devices, e.g., mobile phones, to be associated with a single Billing Account Number (BAN) of a household. Each user endpoint device has an associated phone number. However, the phone number and the user endpoint device with which the phone number is associated may not be assigned to a specific member of the household. As such, location based demographics models may be built only at the household level, providing no information regarding particular users and their respective interests. As such, the location based demographics model has limited value. For example, demographics data at a household level may not contain a level of detail that is needed for targeted marketing.

SUMMARY OF THE DISCLOSURE

In one embodiment, the present disclosure describes a method and apparatus for assigning a phone number that is unassigned to a user. For example, the method implemented via a processor obtains the phone number that is unassigned from a list of phone numbers associated with a billing account number, assigns the phone number that is unassigned to the user, wherein the user is selected from among a plurality of users associated with the billing account number, determines a confidence level for the assigning of the phone number that is unassigned to the user, and performs an analysis to provide a service for the user to whom the phone number is assigned.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
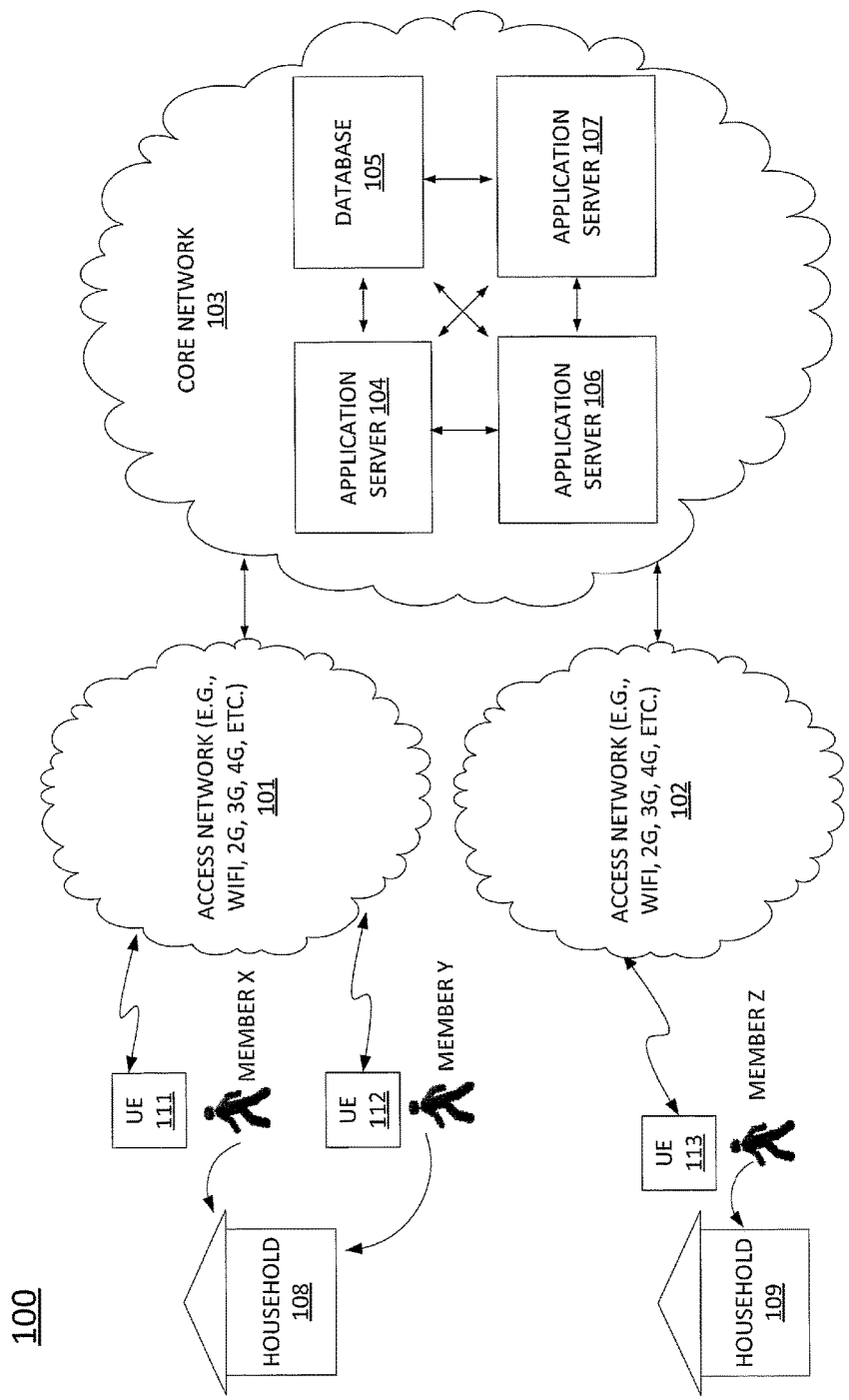
FIG. 1 illustrates an exemplary network related to the present disclosure.

When a customer orders a mobile service from a network service provider (e.g., a cellular network service provider), the customer may request a number of wireless phones to be provided by the network service provider for the customer's household or business. Typically, each phone has its own phone number, and is intended to be used by one individual in the customer's household or business. The service provider provides the requested number of phones, activates the service for all the phone numbers, associates each of the phone numbers with a single Billing Account Number (BAN) of the customer, and bills the customer in accordance with a service agreement.

Although the customer may provide some level of demographic or personal information to the network service provider that will be associated with the BAN, such personal information may not be accurately associated with one of the plurality of phone numbers associated with the BAN. For example, if the customer is a 40 year old male customer who is married and has two teenage children, then the customer may order four (4) phone numbers, one for himself, one for his wife and the other two phone numbers for the two college age children. However, the personal information obtained by the network service provider may only relate to the 40 year old male customer and demographic or personal information for the other remaining members of his household will not be available to the network service provider.

Thus, the network service provider may not know which individual in the household or business is using a particular phone number. One approach for building a demographics model is to have the network service provider associate all phone numbers in the customer's household with the individual who ordered the service and/or who is paying for the service, e.g., the head of the household. The demographics and service usage information may then be gathered at the household level. However, if all phones are assumed to be carried by the head of the household, the demographics model may be biased towards a population that comprises heads of households, e.g., middle aged population, male, higher income than average, and so on. For instance, if the actual users are college-aged children of the customer, then the demographics and service information about the college-age children may be misleading.

Another approach for building the demographics model is using data from households with only one phone number. However, such data may also be biased towards older customers living alone. As such, a location based demographics model that is built at the household level has limited value for advertising, managing churn (e.g., when a subscriber terminates his or her service with a network service provider), providing additional services, etc. Thus, the network service provider may wish to build a demographics model at an individual user level, rather than at the household level.

However, building a demographics model at the individual level is a non-trivial matter. For example, each BAN within the household may be associated with several phones and their respective phone numbers. In addition, the network service provider may not have information with respect to the number of members of the household, which member of the household is using each particular phone number, demographics data with respect to each member of the household, and so on.

For an illustrative example, if a household has n mobile phone users on a single BAN, a particular phone number associated with the BAN may be assigned to anyone of the n users. The n users may have different demographics data, may have varying usage patterns for services provided by the network service provider, and may have varying interests that could be deduced to enhance the services that can be provided to different users, e.g., providing relevant offers that are more likely to be well received by the users. For example, venues that cater to younger demographics groups may wish to promote their products and/or services to young adults. Thus, a network service provider being able to deduce which phone numbers associated with the BAN of the household are being used by the younger users of the household will allow the network service provider to assist the venues with their promotional effort without disclosing any personal information associated with the BAN to the venues. For example, if the users have opt-in to allow the network service provider to assist the venues with their promotional efforts, then such "opt-in" users will be able to receive promotional offers that the users are most likely to accept. However, users who have not opted-in to such services will not receive such promotional offers. Irrespective of whether the users have opt-in or opt-out of such services, the users' personal information or specific individual demographics would not be disclosed to any third parties. At most, aggregated statistics about the typical demographics are to be used, i.e., the aggregated statistics have been anonymized so that specific individual personal information cannot be deduced.

The present disclosure broadly describes a method, a computer-readable storage device and an apparatus for identifying a user (e.g., an individual user) for a phone number, wherein the user is identified from among a plurality of users associated with a single BAN. Although the teachings of the present disclosure are discussed below in a context of a cellular network, the teaching is not so limited. Namely, the teachings of the present disclosure can be applied for identifying users (i.e., individual users) of a product and/or a service, when a subscription to the service and/or the product is not at a per individual user basis.

FIG. 1 illustrates an example network 100 related to the present disclosure. In one illustrative embodiment, the network 100 comprises User Endpoint (UE) devices 111-113, access networks 101-102, and a core network 103. Users of UE devices 111-113 may access services from the core network 103 via any number of access networks, e.g., an access network 101 or 102.

The access networks 101-102 may comprise a Wi-Fi network, a cellular network (e.g., 2G, 3G, and the like), a long term evolution (LTE) network, and the like, related to the current disclosure. The core network 103 may comprise any type of communication network, such as for example, a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network. It should be noted that an IP network is broadly defined as a network that uses Internet Protocol to exchange data packets.

Figure 3:
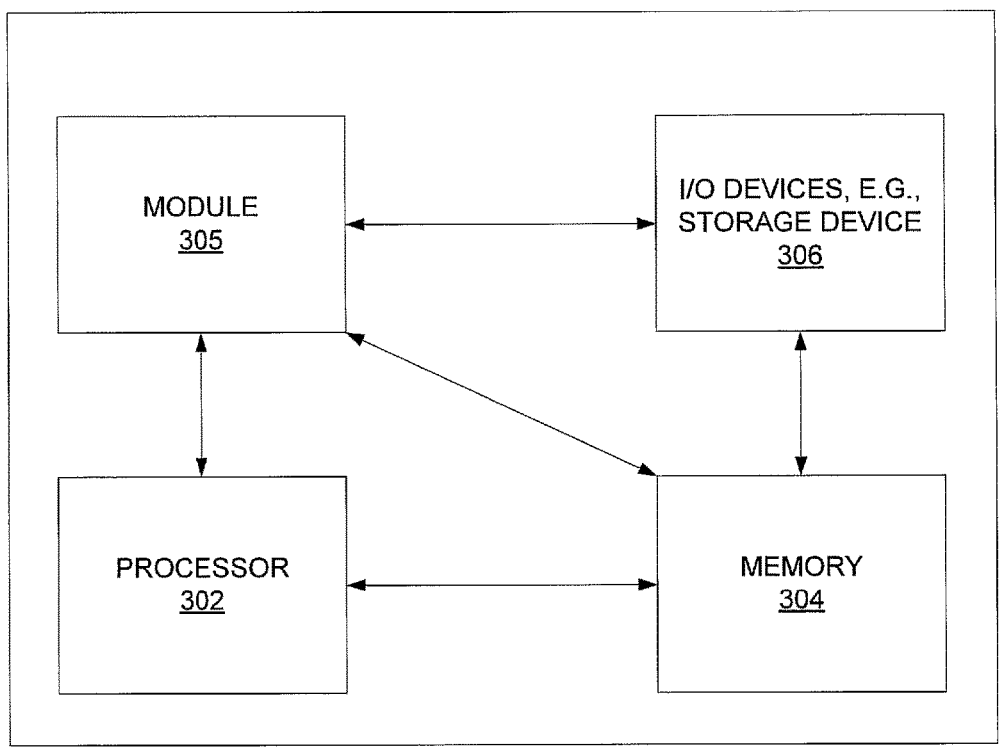
FIG. 3 depicts a high-level block diagram of a computer suitable for use in performing the functions described herein.

In one embodiment, the core network 103 may include an application server (AS) 104, and a database 105. The AS 104 may be deployed as a hardware device embodied as a dedicated computer (e.g., the computer 300 as illustrated in FIG. 3). In one embodiment, the AS 104 may perform the methods and functions described herein (e.g., the method 200 discussed below).

In one embodiment, the network 100 may include additional access networks that are not shown to simplify FIG. 1. In one embodiment, the access network and the core network of FIG. 1 are simplified and it should be noted that these networks may include additional network elements (not shown), such as for example, base stations, border elements, gateways, firewalls, routers, switches, call control elements, various application servers, and the like.

In one embodiment, the database 105 is used for storing various data, e.g., a list of customers and/or household members, demographics data, network records, e.g., data usage, voice call records, Short Message Service (SMS) usage data, etc. The various types of data may be stored in any number of databases.

In one embodiment, the core network 103 may also include a server 106 for linking BANs with demographics data of households. The server 106 provides the linked BAN and demographics data of households to the AS 104.

In one embodiment, the AS 104 is used for assigning a phone number to a particular user (broadly attributing a phone number to a particular user of a household or BAN), from among all users associated with the BAN in accordance with the method of the present disclosure. The phone number that is being assigned in accordance with the present method is previously unassigned. For clarity, a phone number is defined as being unassigned when the user of the phone number is not known by the service provider. Note that the network service provider may only have information at the household level but not at an individual user level within the household. For example, the network service provider, e.g., AT&T Inc.®, may know a phone number 123-456-7890 is associated with a BAN of a household located at 123 Main St., in the Township of XYZ, in the state of NJ. However, if the household comprises a four member household, the phone number 123-456-7890 is deemed to be "unassigned" if the network service provider, does not know which member of the household is carrying the user endpoint device associated with the phone number 123-456-7890. Thus, the term "unassigned" is broadly to mean that the phone number is not conclusively attributable to a particular individual within the multi-member household.

The AS 104 is tasked with assigning or attributing each phone number that is unassigned to a member of the household in accordance with the current disclosure. For instance, three phone numbers may be associated with a BAN. Household demographics data may indicate that the household comprises three members. Each of the user endpoint devices 111, 112 and 113 is associated one of the phone numbers associated with the BAN. Then, each of the phone numbers associated with the respective UEs 111, 112 and 113, may be assigned by the AS 104 to a particular member of the household from among the three members of the household that is indicated in the demographics data.

In one embodiment, the AS 104 also provides a confidence level for the assigning of the particular phone number to the particular user. For instance, suppose UE 111 is assigned to member X in a household 108, UE 112 is assigned to member Y in the household 108, and UE 113 is assigned to member Z in a household 109. Then, the AS 104 provides a confidence level that indicates the probability of the assignment of UE 111 to member X being accurate, a confidence level that indicates the probability of the assignment of UE 112 to member Y being accurate, and a confidence level that indicates the probability of the assignment of UE 113 to member Z being accurate.

In one embodiment, the AS 104 may also perform an analysis for providing products and/or services to the user to whom the phone number is assigned. In another embodiment, the core network 103 may also include a server 107 for performing a further analysis for providing other products and/or services based on the assignment of the phone number to the user. For example, the AS 104 may provide an output to the server 107, for each BAN, which includes: a list of phone numbers, an assignment of each phone number in the list to a particular member of a household, and a confidence level for the assignment of each phone number in the list to the respective member of the household. In turn, the server 107 may perform an analysis to deliver a different set of services to different members of the household. For instance, the AS 104 may provide network based services (e.g., cellular services, phone services, network access services (e.g., Internet access services), media access services (e.g., downloading or uploading of multimedia bytes and the like)) and so on, whereas server 107 may provide targeted advertising for a non-network based service and/or product, e.g., a discount for a service or product of a retailer, a merchant, a restaurant, a store, and so on.

Note that the analysis of the present disclosure may be performed via a generic analytic engine. However, in one embodiment, such analyses can also be performed in AS 104 and other servers, e.g., server 107.

As described above, the AS 104 may be tasked with assigning particular phone number to a particular member of a household. However, in order to perform the assignment, the AS 104 needs information in regards to membership of the household. For example, if a household has five mobile phones associated with the BAN and there are five members of the household, there are five candidates to whom each particular phone number that is associated with the BAN may be assigned. The network service provider may obtain data for determining to whom a phone number should be assigned and for developing demographics and usage models from various sources. In one embodiment, the various sources include one or more of: the customers themselves, one or more third party household demographics data providers, and measurements gathered by servers in the network service provider's network. The data from the various sources are then combined and analyzed.

A first source for data associated with a household is the customer. In one embodiment, the customer of the network service provider may directly provide to the network service provider, the names of the users of the phone numbers in the household. For example, a particular member of the household may be responsible for procuring the subscription of the network service. A plurality of phone numbers and their respective mobile devices (UEs) may be attached to a same BAN. The "procuring" member of the household may provide to the network service provider a list of names of the users in the household. In one embodiment, the procuring member may also identify, for each phone number associated with the BAN, which member of the household will be the user of a respective phone number. In one embodiment, the procuring member of the household may also provide demographic information for all members of the household when subscribing to the network service.

In another embodiment, the demographic information is provided by the customer at a later time, e.g., via a web interface. For example, the customer may have an opportunity to enter information about the customer's household where an incentive can be provided as a reward for the additional personal information. A first example incentive may comprise providing additional service features to the customer for a reduced cost or at no-cost. A second example of an incentive may be the customer being able to receive various usage measurements on a per user basis that will allow the customer to better manage the subscribed services. A third example of an incentive may be the customer being able to experience a more accurate display for a caller ID feature. For example, if the actual user's name is known, the caller ID feature may display the actual user's name of a household member, e.g., a teenage member, instead of the name of the customer who procured the network services and who is likely listed as the name on the bill for the BAN.

The names of the users and their respective phone numbers obtained directly from the customer may be accurately relied upon. However, some customers may not provide the household information upon procuring the network services. Even when the information is subsequently supplemented via a web interface, the customer may not have decided who in the household would be using a particular phone number or the members within the household may decide to swap phone numbers at a later time unbeknown to the network service provider. In addition, there may be scenarios where the customer may not be willing to provide such personal information to the network service provider. For example, some parents may be willing to provide their own names to the network service provider but not necessarily the names of their children. Furthermore, the customer may add additional mobile phones as the family size grows but may not provide an updated list of users. A second source for data associated with households is a third party household demographics data provider, e.g., Acxiom Corporation, and the like. For clarity, household records as identified by third party household demographics data provider will be referred to as third part households. Various types of data can be collected by such third party household demographics data providers. Some examples of data include: population statistical data (e.g., total area in a postal zip code, total population in the postal zip code, average income in the zip code), information at the household level such as age statistics, gender statistics, ethnicity statistics, affluence information, technology adoption information (if available), etc.), and for members of the household, a set of individualized data, e.g., age, gender, marital status, occupation, credit card usage, ethnicity, religion, and so on. Again, it should be noted certain types of data will not be collected, e.g., statistics relating to minors, statistics prohibited pursuant to relevant customer privacy policies and/or government regulations will not be collected.

It is important to note that a "third party household" may not be the same as a household as defined by BAN of the network service provider. Multiple BANs may exist for a same third party household. In one example, in a college dormitory building there may be several BANs for a same third party household. In another example, one member of a family may be physically located at a first address while the phone service is associated with a BAN of a second address. For instance, when a college student is at a college address while the billing account number remains at the home of the parent, the BAN is associated with the address of the parent while the third party household is that of the college. For most cases, there is a one-to-one mapping between BANs and third party household. However, the present disclosure is concerned with assigning each phone number to an individual person. As such, the method is equally applicable whether or not the mapping between BANs and third party households is one-to-one.

The present disclosure also receives a mapping of data that links BANs with third party households. For example, a server 106, in the service provider's network may be tasked with producing a list of BANs and their respective third party households. The server may then match BANs to third party households at the household level. The present disclosure is advantageous in that it matches one person within the third party household with one phone number associated with the BAN. That is, the present disclosure teaches matching at the individual person level, rather than at the household level.

A third source for data associated with the households is phone usage measurement data gathered by the network service provider. The network service provider may measure data for various attributes and may aggregate the measurements over a pre-determined period of time, e.g., a month, a year. In one embodiment, the measurements may be for determining, for each phone number, usage measurement data for various attributes that comprise one or more of: an International Mobile Subscriber Identity (IMSI), a make and model of a phone, a type of device (e.g., 3G device, LTE device, etc.), a type of wireless network (e.g., 2G, 3G, 4G, etc.), a measurement of data usage, a number of data sessions, a number of data sessions that ended normally, a number of data sessions that ended abnormally, error statistics for data sessions, total data usage for downlink, total data usage for uplink, signal strength statistics (e.g., average signal strength, maximum signal strength, minimum signal strength), data usage per network type (e.g., total number of bytes over an LTE network, total number of bytes over a 3G network, etc.), a measurement of Short Message Service (SMS) usage, a measurement of voice call usage to an extent allowed by privacy rules (e.g., while complying with privacy rules), and so on. For example, a network service provider may measure data for 40 different attributes and aggregate the measurements on a monthly basis.

The list of usage measurement data provided above is illustrative and is not intended to be limiting. The network service provider determines the list of measurement data to be gathered and to be used for identifying a user of the phone number in accordance with the teachings of the present disclosure. In one example, for users who opt-in if social media usage is indicative of which individual in the household uses the particular phone number, the method may gather information on social media usage. In another example, for users who opt-in if entertainment content is indicative of which individual in the household uses the particular phone number, the method may gather information on the types of entertainment content obtained via the phone. For example, if music video programming is being accessed, the phone number may potentially belong to a young adult. In contrast, if stock market data is being accessed, it is more likely the phone number belongs to an adult member of the household.

As described above, data for identifying which individual in a household is the particular user of a particular phone number may be obtained from various sources that include one or more of: the customers themselves, third party household demographics data providers, and/or usage measurements. The names of users and their respective phone numbers obtained directly from the customer are assumed to be reasonably accurate and may be readily used for matching a phone number with a particular user in a household. For example, the method may compare names provided by the customer against names obtained from the third party household demographics data provider. If a match is found, the method may then assign the phone number to the particular user that the customer has provided as being the user of the phone number. The data associated with that phone number from the various sources may then be associated with the particular user to whom the phone number is now assigned. For example, the usage measurements for data, location information, interests, etc., would then be assumed as being associated with the particular user. Content, e.g., advertisements for products and services, targeting the particular phone number would then be delivered based on the conclusion that the particular user is the target audience for the content.

If the customer volunteered the names of the individuals using each phone number associated with the BAN, the assigning step of the present disclosure may be performed assuming that the personal information provided by the customer is accurate. The network service provider may be able to perform a percentage of assignments of phone numbers to users (individual users) using the personal information obtained directly from the customers. For a non-limiting example, an AS 104 may perform assignments of phone number to users for 30% of the phone numbers using individual user information obtained directly from customers. Several factors may contribute to this relatively low match percentage of 30%. For example, users may use different surnames such as Bob versus Robert. Another contributing factor is the misspelling (broadly errors) of the user names in the data set. Another contributing factor is that third party household demographics data providers may not have properly accounted for all individuals in a household.

In one example, unlike the data received from customers, the data received from the third party household demographics data providers and from usage measurements on various attributes, are used in conjunction with a machine learning algorithm that predicts which individual in a household is most likely to be the user for a particular phone number. However, more assignments may be achieved, if assignments are first made based on the data obtained from the customer directly and then a prediction model is applied to assign the remaining phone numbers using a prediction algorithm. For a non-limiting example, 75% of phone numbers may be successfully matched with a specific user in a household, after assignments are first made based on data obtained directly from the customer and then based on the prediction model. Hence, the prediction model improves the number of matches significantly.

In one embodiment, the machine learning algorithm comprises a Gradient Boosted Decision Tree (GBDT) algorithm. However, any other algorithms for machine learning, e.g., a neural network algorithm, may be used.

Prior to being used to perform a prediction, the learning algorithm needs to be trained. However, all information about phone services in every household is not suitable for training the model. For example, a customer may directly provide to the service provider information as to which individual in the household is the user of each phone number. Another customer may provide partial information. Yet a third customer may provide no information at all as to the identities of the users.

In one example, the method of the present disclosure performs the training of the predictive algorithm using a list of customers and their respective phone numbers, wherein the network service provider received a name of a user for each phone number directly from the customer. The name may be provided by the customer during subscription to a service and/or via a web portal. The data to be used for training the model may then comprise the phone numbers with known users. For instance, a household may have a BAN with five mobile phone numbers associated with the BAN. If names are provided by the customer to the service provider for the five mobile phone numbers, then the five phone numbers may be members of data used for training the predictive algorithm. In one example, only a subset of the customer provided data is used in training the model.

It should be noted that the data gathered from various sources may not be in a proper format for building the predictive model. As such, some pre-processing of the overall set of data is performed to generate various subsets of data, e.g., a subset for training, a subset for testing, and a subset for validation, as described below.

For an illustrative example, data from various sources may be joined as shown below in Table 1. Note that the number of attributes for which usage information may be collected is not limited to those shown in Table 1. The content of the table is limited for simplicity purposes and is not intended to be a limitation on implementation.

TABLE 1

An illustrative data set joined from various sources.

| BAN | Phone number | Name provided by customer | Demographics data given as name/gender/age tuples | Monthly data usage | Monthly SMS usage | Account (Mobile with x number of lines) |
|---|---|---|---|---|---|---|
| 1 | 123-456-7890 | John Doe | {(John Doe, Male, 40), (Jane Doe, Female 39), (Bill Doe, Male, 8)} | 200 Mb | 100 | 3 lines |
| 1 | 123-456-7891 | | {(John Doe, Male, 40), (Jane Doe, Female 39), (Bill Doe, Male, 8)} | 100 Mb | 200 | 3 lines |
| 1 | 123-456-7892 | | {(John Doe, Male, 40), (Jane Doe, Female 39), (Bill Doe, Male, 8)} | 800 Mb | 1000 | 3 lines |
| 2 | 123-xxx-xxx0 | Abc | {(Abc, Male, 50), (Xyz, Female, 50)} | 500 Mb | 50 | 2 lines |
| 2 | 123-xxx-xxx1 | Xyz | {(Abc, Male, 50), (Xyz, Female, 50)} | 500 Mb | 600 | 2 lines |

The BANs numbered 1 and 2 are associated with 3 and 2 mobile phone numbers, respectively. For BAN number 1, the customer provided one name (i.e., John Doe), while the demographics data obtained from a third party provided three names along with their respective demographics data. For BAN number 2, the customer provided a name for each of the two phone numbers. The demographics data for BAN number 2 also shows the same names provided by the customer. The monthly usage measurements are provided for all of the above phone numbers. Assuming, no data is reserved for a validation set, the data in the table may be sorted to generate two sets of data, a training set and a test set. The training set may include the phone numbers that have a customer provided name that matches one of the names obtained from the third party. The remaining data is used to generate the test set.

For the example above, the training set would include the data associated with phone numbers 123-456-7890, 123-xxx-xxx0, and 123-xxx-xxx1. The phone number 123-456-7890 is being used by John Doe, the phone number 123-xxx-xxx0 is being used by Abc, and the phone number 123-xxx-xxx1 is being used by Xyz. The data associated with the remaining phone numbers (i.e., 123-456-7891 and 123-456-7892) would then be part of the test set. The phone numbers that are part of the training set are assumed to be matched with 100% confidence level. The phone numbers that are part of the test set will need to be matched to a user by applying the predictive algorithm, after the prediction model is trained on the training set. In order to increase the number of phone numbers that are successfully matched without applying a prediction algorithm, further enhancements may be performed on the data. For example, the list of names provided by the customers and/or retrieved from the third party may be modified to include nicknames and/or alternative spellings. For instance, a first name Richard may be equated (e.g., through the use of publically available dictionaries of surnames) to Rich, Rick, Rickie, Ricky, Dick, etc. For the example above, the name Bill might be a nickname for William.

Returning to the description of the training of the prediction model, the learning occurs using the data from the training set. Each data element in the training set comprises a particular phone number that is paired with usage measurements and demographics data of two members of a household, with one of the members of the household being the actual user of the particular phone number. The other member of the household, the member that is not using the particular phone number, may be referred to as the "non-user" for the particular phone number. Each data element may then be converted to generate one positive training example and one negative training example. The positive training example ranks the actual user of the particular phone number above the other member (e.g., the non-user) of the household. The negative training example ranks the non-user of the particular phone number above the actual user of the particular phone number. For an illustrative example, suppose the training set includes a phone number of a household that has two members, one male member who is 35 years old and one female member who is 33 years old. Suppose also that the actual user for a particular phone is the female user. Then, one positive training example ranking the female household member above the male household member is generated (e.g., (1, female, male, phoneNumber123 Measurements). Similarly, one negative training example ranking the male household member above the female household member is generated, e.g., (0, male, female, phoneNumber123 Measurements). In other words, the two training examples: (1, female, male, phoneNumber123 Measurements), and (0, male, female, phoneNumber123 Measurements), indicate that the female should be ranked above the male for attributes pertaining to phone number 123. During the training stage, for each positive example, the target value is set to be 1, and for each negative example, the target value is set to be 0. The machine learning algorithm uses these preset target values to learn how to predict real values on examples that would not provide a target in the prediction stage, such as examples that will comprise the test set.

The illustrative setting described above allows the use of a machine learning regression model, i.e., a model that tries to predict real value scores (as opposed to a classification model, that would produce a hard decision for each pair). For example, initially, the assignment problem (i.e., deciding which member of the household is the user of a given phone) is not a standard formulation for most machine learning algorithms. One advantage of the described preprocessing is that many regression models exist.

For example, the regression method described here allows a range of scores for the test set to be produced. As an example, assume that all the positive examples are labeled with 1, and the negative examples are labeled with 0. Then, the machine learning algorithm will produce any real numbers between 0 and 1 as predictions on the test set, depending on the likelihood of the test example to be either positive or negative. These real valued scores (as opposed to hard assignment decisions) allow the present method to compute confidence values as discussed below.

During training, the algorithm may be provided input that includes, for each BAN in the training set, phone numbers associated with the BAN, a size of a household for the BAN, which individual user in the household is using each particular phone number associated with the BAN, household demographics obtained from third party household demographics data providers, usage measurements for various attributes as gathered by the service provider. The algorithm computes, over all pairs in the household where one of the two members is a phone user, positive and negative training examples that can be used as inputs for a regression machine learning model.

Once the training of the prediction algorithm is completed, the prediction algorithm may be applied to phone numbers in the test set that are not assigned to a user. For each particular phone number in the test set, the prediction algorithm outputs a score that predicts whether two arbitrary members of a household can be in a specific ranking for the particular phone number. Thus, the scores are for pair-wise ranking. Then, for each particular member of the household, the method sums all the scores in which the particular member of the household is ranked above all other members of the household. The method then assigns the phone number to the member of the household with a largest sum of scores. In other words, the comparison is made based on a sum of scores, wherein the sum of scores for each particular member of the household is computed over scores in which the particular member of the household for whom the sum is being computed is ranked above the other members of the household.

For example, during the prediction stage for each attribute, if members A and B are both members of a household, the algorithm computes a score for ranking member A as being more likely than member B to be the user of a particular phone number. In addition, the algorithm will also compute a score for ranking member B as being more likely than member A to be the user of the same phone number. For this example, since there are only members A and B, the larger computed value between member A and member B is determined to be the user of the particular phone number. The phone number is then assigned to the member with the larger value of the computed scores.

In another example, if there are three members, e.g., A, B and C, in the household, the algorithm computes six pair-wise scores for ranking, A and B, A and C, B and A, B and C, C and A, and C and B for each particular phone number. At the prediction stage, since it is not known a priori who is the real user of the particular phone number, it will be necessary to look at all potential pairs, i.e., (A, B), (A, C), (B, A), (B, C), (C, A), and (C, B). The method will compute three final scores:

Final score for $A$=predicted score on $(A,B)$+predicted score on $(A,C)$

Final score for $B$=predicted score on $(B,A)$+predicted score on $(B,C)$

Final score for $C$=predicted score on $(C,A)$+predicted score on $(C,B)$

The phone number is then assigned to a member of the household with the largest sum of scores, when the member is ranked above all other members of the household.

In one embodiment, the method also determines a confidence level for the assigning of the phone number to a particular member of the household. The confidence level is expressed as a probability of an assignment of a phone number to a particular member of a household being correct. For example, if the sums of the scores, as computed above, are almost the same for every member of the household, the confidence level in the predicted assignment may be low. In contrast, if the sum of the scores for one member is 200% more than for any other member, the confidence level may be significantly higher, e.g., close to one.

In one embodiment, the confidence level is determined by computing a probability of an assignment being correct using standard validation techniques, with known data. For instance, in the example described above, the data to be processed was divided into two subsets, a subset for training and a subset for testing. However, if validation is desired, the data may be divided into three subsets, with the additional subset being reserved for validation purposes. The data to be used for validation is similar to that used for training. Hence, the subset for validation may be obtained by reserving a proportion of data that is suitable for training.

When the training of the prediction algorithm is completed, the prediction algorithm may be applied on the subset of data reserved for validation. The method may then compute a difference in sums of scores (e.g., the difference between the largest two sums) to a probability of an assignment being correct. Since the actual users are known for all the phone numbers in the validation subset, the accuracy of the assignment may be objectively measured for the phone numbers in the validation subset.

For example, suppose the confidence level being computed is for two household members and the validation subset has 10000 phone numbers associated with two member households. The method may perform the ranking for all 10000 phone numbers. The method may also compute, for each phone number, a variable, $\delta$, for recording the difference in sums of scores between the two members in the household. The method may then sort the phone numbers in decreasing magnitude of $\delta$, as computed for the various phone numbers. For example, inspection of the validation set may indicate, if the scores are different by a value of $\delta$ of at least 0.2, the assignment is correct with a confidence probability of 0.9. In another example, if the scores are different by a value of $\delta$ of at least 0.005, the assignment is correct with a confidence probability of 0.52. In another example, if the scores are different by a value of $\delta$ of at least 0.5, the assignment is correct with a confidence probability of 0.999.

Then, for phone numbers in the test subset, the confidence level is predicted for similar households. For example, the confidence level may depend on a size of the household. The score difference between the two largest scores may be insignificant for a household with just two members and may be significant for a family with 10 household members. In one embodiment, the method of the present disclosure determines the confidence levels per a given number of household members.

In one embodiment, the method outputs, for each phone number in a BAN of a household, one or more of: an assignment of the phone number to a particular member of the household, and a confidence level for the assignment of the phone number to the particular member of the household. In one embodiment, the method also outputs demographics data of the particular member of the household, and whether the assignment was made using a name provided by the customer or using a prediction.

In one embodiment, the method performs an analysis to provide a product and/or a service based on assignments of each phone number to a particular user. For example, the method may analyze demographics data, usage data, location data, etc., for each particular user. The result of the analysis may be aggregated to be used for various purposes. In one example, the network service provider may wish to target certain types of services for heavy data users, others for SMS users, and so on. The network service provider may also use the analysis for managing customer satisfaction and churn. For example, if a service interruption occurs while the head of the household is streaming video the customer may be motivated to switch to a different network service provider based on the interruption. In contrast, if a college-age child is streaming video and gets interrupted, the customer may be less likely to switch to a different network service provider. Namely, the interruption experienced by the child may not have been communicated to the customer. Thus, knowledge of which individual is using each phone number associated with a household may be beneficial for addressing service interruptions and/or churn modeling.

In another example, the network service provider may utilize the anonymized user information to assist advertisers who may wish to know which demographics group/groups to target for a service or product advertising. Again, all user information are to be aggregated and anonymized so that the user personal information will not be disclosed. In yet another example, location data of users may enable advertisements on electronic billboards to target specific types of audiences at specific times. For example, during morning and afternoon commutes, the assignment information may indicate that the users traversing on various roadways are of a specific demographics group, e.g., heads-of-household, people with above average income, people with a particular interest, etc. Pertinent advertisements can then be selectively presented on such electronic billboards based on this information.

In one embodiment, the method of the present disclosure may provide to the customer an opportunity to confirm the assignment of the phone number to each user in the household. For example, the service provider may enable the customer to opt-in for receiving products and/or services based on individual level demographics and usage data. If the subscriber opts-in, the network service provider may then assign the various phone numbers in the household and present the customer with an opportunity to confirm the assignments and/or make corrections to the assignments.

In one embodiment, the customer is presented with an opportunity to confirm the assignment when the confidence level associated with the assignment exceeds a pre-determined threshold. For example, if the probability of the assignment being correct is one, the network service provider may present the opportunity to the customer. In contrast, if the probability of the assignment being correct in a household with two members is 0.5, the network service provider may prefer not to present the assignment that is based on a prediction that has a 50% chance of being incorrect. In other words, a customer may not be adverse as to confirming the assignment if the assignment is accurately correct. For example, a customer may simply be too busy to provide the demographic information to the network service provider. However, once the demographic information has been properly correlated, the customer may be willing to provide the assignment confirmation to the network service provider.

Figure 2:
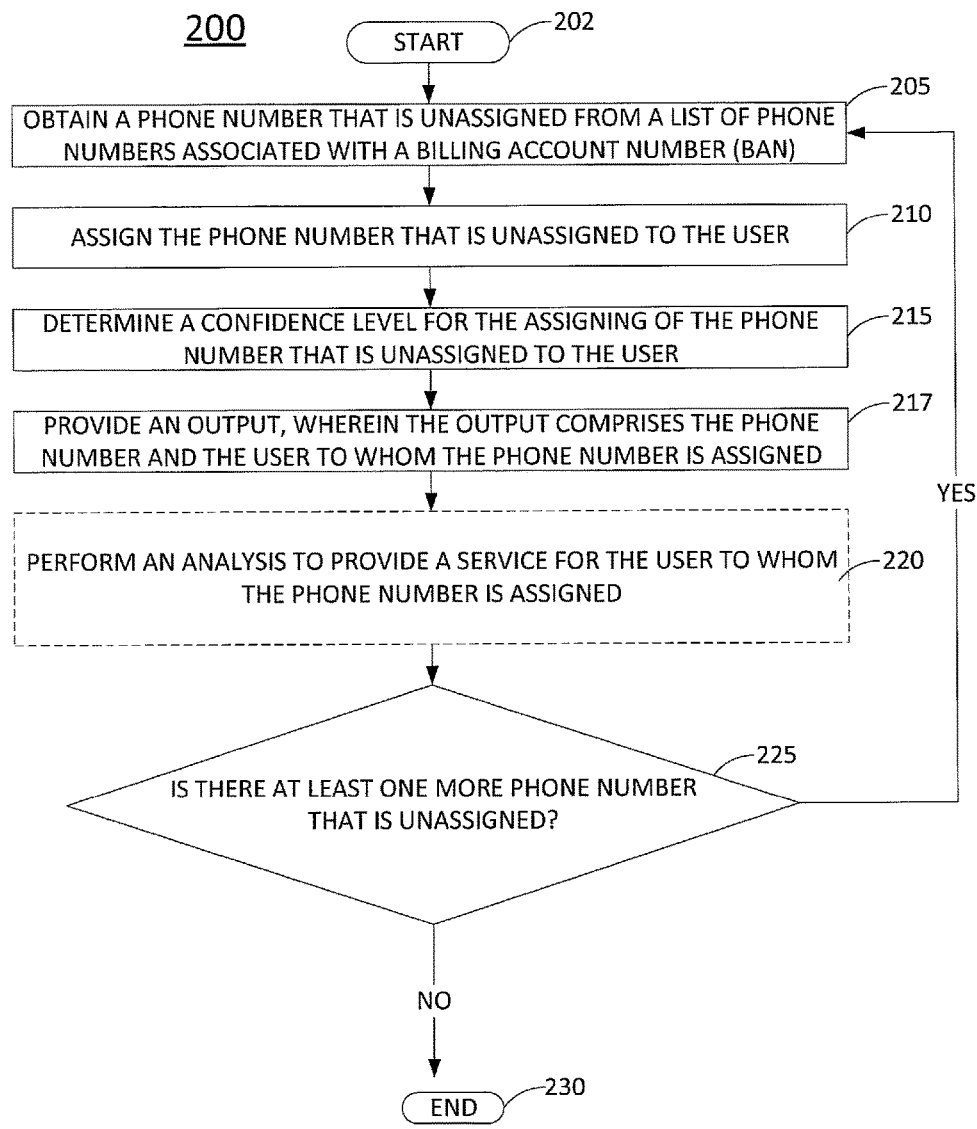
FIG. 2 illustrates a flowchart of a method of the present disclosure for assigning a phone number to a user from among all users associated with a billing account number.

FIG. 2 illustrates a flowchart of an example method 200 of the present disclosure for assigning a phone number to a user from among all users associated with a billing account number, wherein the phone number is unassigned. In one embodiment, the method 200 may be implemented in a server, e.g., an application server 104 for performing the assigning or the computer or processor as described in FIG. 3. Method 200 starts in step 202 and proceeds to step 205.

In step 205, the processor obtains the phone number that is unassigned from a list of phone numbers associated with a billing account number (BAN). For example, for a particular BAN, there may be n phone numbers associated with the BAN, with m of the phone numbers being unassigned to a user. The method 200 then obtains a phone number from among the m phone numbers that are unassigned to a user.

In step 210, the processor assigns the phone number that is unassigned to the user, wherein the user is selected from among all users associated with the BAN. In one embodiment, the assigning of the phone number that is unassigned to the user is performed in accordance with user information received from a customer associated with the BAN. In one embodiment, the assigning of the phone number that is unassigned to the user is performed using a prediction algorithm.

In step 215, the processor determines a confidence level for the assigning of the phone number that is unassigned to the user.

In step 217, the processor provides an output, wherein the output comprises the phone number, and the user to whom the phone number is assigned. In one embodiment, the output may also comprise the confidence level for the assigning of the phone number to the user.

In optional step 220, the processor performs an analysis to provide a service for the user to whom the phone number is assigned. For example, the method may perform an analysis to provide a service such as: providing a targeted content to the user (e.g., an advertisement, a video (e.g., a newly released music video, a new movie trailer), an audio (e.g., a newly released song), an offer for a third party service or product, a coupon (e.g., from a restaurant, from a department store, a particular type of online or brick and mortar retailer (e.g., a shoe store, an electronic store, a book store and the like)), providing a new mobile phone feature to the user (e.g., video conferencing feature, international calling plan feature, and the like), providing an improvement for a service (e.g., greater bandwidth, higher priority treatment, a lower cost service plan and the like), etc.

In step 225, the processor determines whether there is at least one more phone number that is unassigned. If there is at least one more phone number that is unassigned, the method proceeds to step 205. Otherwise, the method proceeds to step 230 to end processing the current list of phone numbers that are unassigned.

Although the phone numbers can be processed independently of each other as discussed above (i.e. one after another, where there is no joint optimization of the assignments), the present method may implement joint assignment optimization as well. For instance, for a given household, assume two members and two phone numbers. There is only two possible "configurations" under this scenario: Either the two phone numbers are assigned to one household member, or alternatively each household member gets one phone number. One can compute the overall probability of these two configurations on the training set (e.g., the first case (call it case 1) occurs only 5% of the time, while case 2 occurs 95% of the time).

Let A be the random variable associated with a particular set of assignments for all the phones within a given household. Let B be the random variable associated with the configuration obtained from a particular assignment A. Basic laws of probability gives that the joint probability $P(A,B)=P(B) P(A|B)$, where $P(A|B)$ is the probability of event A given that we observe event B.

One can compute an estimate of $P(B)$ using the training set (e.g. assigning the two phones to the same person only has 5% probability). The estimate of $P(A|B)$ can be computed using a softmax function on all the computed scores above for assignments that correspond to each configuration B. The softmax function essentially converts scores with arbitrary ranges, such as the computed scores described above into probabilities that sum to 1.

For instance, define assignments as $A=\{1,2\}$ to mean that the first phone goes to person 1, second phone goes to person 2. In the same manner, $A=\{1,1\}$ means that both phones go to person 1, etc. Assume that the aforementioned softmax function yields the following joint probabilities:

$P(A=\{1,1\}|B=1)=0.3$ (the probability that the two phones go to person 1, given that the configuration is 1)

$P(A=\{2,2\}|B=1)=0.7$ $P(A=\{1,2\}|B=2)=0.2$ $P(A=\{2,1\}|B=2)=0.8$

All the other probabilities are equal to 0. Then, applying basic laws of probabilities, $P(A)=\text{sum\_B } P(A,B)=\text{sum\_B } P(B) P(A|B)$.

For instance, following the same example, one would have:

$P(A=\{1,1\})=P(B=1)P(A=\{1,1\}|B=1)+P(B=2)P(A=\{1,1\}|B=2)$.

The second term above is 0 because $P(A=\{1,1\}|B=2)=0$ (i.e., it is impossible to assign both phones to person 1 if the chosen configuration is 2). Hence, we have:

$P(A=\{1,1\})=0.05*0.3=0.015$

Similarly, $P(A=\{2,2\})=0.05*0.7=0.035$ $P(A=\{1,2\})=0.95*0.2=0.19$ $P(A=\{2,1\})=0.95*0.8=0.76$ Hence, one may find that the most likely assignment is $\{2,1\}$, i.e., assignment of the first phone to person 2, and assignment of the second phone to person 1.

As such, the present disclosure provides at least one advancement in the technical field of assigning phone numbers to individual users within a household that comprises multiple users. This advancement improves delivery of products and/or services that rely on demographics and usage data that are at an individual user level. Viewed in another manner, the present disclosure provides an efficient way for targeted content delivery to user endpoint devices based on the improved location based aggregated demographics and usage data of the user, wherein the phone number that is being assigned to the user is the phone number for the user endpoint device that is being carried by the user. In addition, the network service provider is able to better manage service interruption to reduce churn and to improve customer satisfaction using the individual user level demographics and usage data. For example, the service may aggregate the information over a zip code, a town, a type of venue, a type of business, etc., and determine how to best serve its customers.

FIG. 3 depicts a high-level block diagram of a computer suitable for use in performing the functions described herein. As depicted in FIG. 3, the system 300 comprises one or more hardware processor elements 302 (e.g., a central processing unit (CPU), a microprocessor, or a multi-core processor), a memory 304, e.g., random access memory (RAM) and/or read only memory (ROM), a module 305 assigning a phone number to a user from among all users associated with a billing account number, wherein the phone number is unassigned, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 200 as discussed above is implemented in a distributed or parallel manner for a particular illustrative example, i.e., the steps of the above method 200, or the entire method 200 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method. In one embodiment, instructions and data for the present module or process 305 for assigning a phone number to a user from among all users associated with a billing account number, wherein the phone number is unassigned (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for assigning a phone number to a user from among all users associated with a billing account number, wherein the phone number is unassigned (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible"

computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for assigning a user to an unassigned phone number that is not assigned to any user, the method comprising:
    obtaining, via a processor of an application server of a network service provider, the unassigned phone number from a plurality of phone numbers associated with a billing account number;
    matching based on household demographics data, via the processor of the application server of the network service provider, the user to the unassigned phone number, wherein the user is selected from among a plurality of users associated with the billing account number;
    determining, via the processor of the application server of the network service provider, a confidence level for the matching based on household demographics data of the user to the unassigned phone number;
    identifying a service based on the confidence level to be provided to the user to whom the unassigned phone number is matched; and
    providing the service to the user.

2. The method of claim 1, further comprising:
    providing an output, wherein the output comprises an identifier of the user and the unassigned phone number that was matched based on the household demographics data to the user.

3. The method of claim 2, wherein the output further comprises the confidence level for the matching based on household demographics data of the user to the unassigned phone number.

4. The method of claim 1, wherein the matching based on household demographics data of the user to the unassigned phone number is performed in accordance with user information received directly from a customer associated with the billing account number.

5. The method of claim 1, wherein the matching based on household demographics data of the user to the unassigned phone number is performed using a prediction algorithm.

6. The method of claim 5, wherein the prediction algorithm is based on data received from a plurality of sources.

7. The method of claim 6, wherein the plurality of sources comprises a first source, wherein the first source comprises a customer associated with the billing account number.

8. The method of claim 7, wherein the data received from the first source is a name of the user for the unassigned phone number.

9. The method of claim 7, wherein the plurality of sources comprises a second source, wherein the second source comprises a third party household demographics data provider.

10. The method of claim 9, wherein the data received from the third party household demographics data provider includes one or more of: a family size for a household, a family income, a population statistical data, and for each member of the household, a set of individualized data.

11. The method of claim 10, wherein the population statistical data comprises one or more of: a total area, a total population, an average income, an average cell phone usage rate, an average data usage rate, an age statistic, a gender statistic, an ethnicity statistic, an affluence statistic, and a technology adoption statistic.

12. The method of claim 10, wherein the set of individualized data comprises one or more of: an age, a gender, a marital status, an occupation, a credit card usage, an ethnicity, and a religion.

13. The method of claim 9, wherein the plurality of sources further comprises a server from which is received a mapping of data that links the billing account number with data received from the third party household demographics data provider.

14. The method of claim 9, wherein the plurality of sources comprises a third source, wherein the data received from the third source comprises usage measurement data from a network service provider.

15. The method of claim 14, wherein the usage measurement data comprises one or more of: an international mobile subscriber identity, a make of a phone, a model of a phone, a type of mobile device, a type of wireless network, a measurement of data usage, a number of data sessions, a number of data sessions that ended normally, a number of data sessions that ended abnormally, a total data usage for downlink, a total data usage for uplink, a signal strength statistic, a data usage per network type, and a measurement of short message service usage.

16. A non-transitory computer-readable storage device storing a plurality of instructions which, when executed by a processor of an application server of a network service provider, cause the processor to perform operations for assigning a user to a unassigned phone number that is not assigned to any user, the operations comprising:
    obtaining the unassigned phone number from a plurality of phone numbers associated with a billing account number;
    matching based on household demographics data the user to the unassigned phone number, wherein the user is selected from among a plurality of users associated with the billing account number;
    determining a confidence level for the matching based on household demographics data of the user to the unassigned phone number;
    identifying a service based on the confidence level to be provided to the user to whom the phone number is matched; and
    providing the service to the user.

17. The non-transitory computer-readable storage device of claim 16, wherein the matching based on household demographics data of the user to the unassigned phone number is performed in accordance with user information received directly from a customer associated with the billing account number.

18. The non-transitory computer-readable storage device of claim 16, wherein the matching based on household demographics data of the user to the unassigned phone number is performed using a prediction algorithm.

19. An apparatus for assigning a user to a phone number that is not assigned to any user, the apparatus comprising:

a processor of an application server of a network service provider; and a computer-readable storage device storing a plurality of instructions which, when executed by the processor, cause the processor to perform operations, the operations comprising:

obtaining the unassigned phone number from a plurality of phone numbers associated with a billing account number;

matching based on household demographics data the user to the unassigned phone number, wherein the user is selected from among a plurality of users associated with the billing account number;

determining a level for the matching based on household demographics data of user to the unassigned phone number;

identifying a service based on the confidence level for the user to whom the unassigned phone number is matched; and performing the service.

20. The apparatus of claim 19, wherein the matching based on household demographics data of the user to the unassigned phone number is performed in accordance with user information received directly from a customer associated with the billing account number.

\* \* \* \* \*